United States Patent [19]

Ostermann et al.

[11] 4,450,320

[45] May 22, 1984

[54] DIALING DEVICE WITH CALLING NUMBER AND IDENTIFICATION MEMORY AND METHOD FOR USING SAME

[75] Inventors: Bernd Ostermann, Weissach; Paul Lissner, Backnang, both of Fed. Rep. of Germany

[73] Assignee: Licentia Patent-Verwaltungs GmbH, Frankfurt am Main, Fed. Rep. of Germany

[21] Appl. No.: 315,140

[22] Filed: Oct. 26, 1981

[51] Int. Cl.³ .......................................... H04M 11/04
[52] U.S. Cl. ............................. 179/5 R; 179/90 BD
[58] Field of Search ............... 179/5 R, 2 A, 5 P, 5.5, 179/90 BB, 90 BD

[56] References Cited

U.S. PATENT DOCUMENTS

| | | | |
|---|---|---|---|
| 4,051,327 | 9/1977 | Rigsby | 179/5 R |
| 4,137,429 | 1/1979 | Stockdale | 179/5 R |
| 4,228,424 | 10/1980 | Le Nay et al. | 179/5 R X |
| 4,241,237 | 12/1980 | Paraskevakos et al. | 179/5 R X |
| 4,338,493 | 7/1982 | Stenhuis et al. | 179/2 A X |

FOREIGN PATENT DOCUMENTS

| | | | |
|---|---|---|---|
| 2730760 | 1/1979 | Fed. Rep. of Germany | 179/5.5 |
| 2806234 | 8/1979 | Fed. Rep. of Germany | 179/5.5 |
| 55-140364 | 11/1980 | Japan | 179/5 R |

*Primary Examiner*—A. D. Pellinen
*Assistant Examiner*—Keith E. George
*Attorney, Agent, or Firm*—Spencer & Frank

[57] ABSTRACT

A dialing device and method for using the device in a common dial network consisting of a central office and a plurality of user stations connected to the central office by subscriber telephone lines. At least one of the user stations is a calling station having a dialing device which incorporates a memory for storing calling number and identification number. The method comprises the steps of establishing a connection between the calling station and the central station via the subscriber terminal lines and via the central office, transmitting the new calling number of the central station and/or the new identification number of the calling station from the central station to the calling station and storing the numbers in the memory of the calling station.

11 Claims, 3 Drawing Figures

DIALING DEVICE WITH CALLING NUMBER AND IDENTIFICATION MEMORY AND METHOD FOR USING SAME

BACKGROUND OF THE INVENTION

The present invention relates to a dialing device having a calling number and identification signal memory. The invention also relates to a method of using the dialing device in a common dial network.

A dialing device for automatically dialing a telephone subscriber terminal is disclosed in German Offenlegungsschrift No. 2,422,545 wherein the sequence of the numbers to be dialed is stored in a memory by means of setting switches. This system has the disadvantage that the setting switches require a relatively large amount of space and, unless measures against unauthorized actuation are taken, can be changed in an unauthorized manner.

German Offenlegungsschrift No. 2,842,776 discloses a dialing device for the automatic establishment of data connections between stations via a dial network. This device includes aa calling number memory in which numbers to be called are stored together with the identification signal of the station at which the dialing device is installed. Storage is effected by the use of plug-in line connections and has the same disadvantages as the system disclosed in German Offenlegungsschrift No. 2,422,545.

Remote control and emergency calling systems also exist which operate with similar dialing devices. These systems employ calling number memories comprising core, semiconductor and other types of memories which can be programmed electronically.

A disadvantage of known dialing devices is that when new stations are established, a memory which has already been programmed must be used or the memory must be programmed at the station location. Further, the same steps must be taken when volatile, buffered memories are used and there is a malfunction in the power supply. In general, when the calling numbers are to be changed, a considerable amount of time and large expenditures for personnel are necessary in order to exchange or reprogram the memories of all of the stations.

It is an object of the present invention to provide a dialing device of the above-mentioned type which can be operated with substantially less personnel and time when establishing stations and for making changes in calling numbers and identification signals.

SUMMARY OF THE INVENTION

The invention comprises a dialing device and a method for using the device in a common dial network consisting of a central office, a plurality of user stations and a control center connected to the central office by subscriber terminal lines. At least one of the user stations is a calling station having a dialing device which incorporates a memory for storing calling number and identification signals. The method comprises the steps of establishing a connection between the calling station and the control center via the subscriber line, the central office and one of the subscriber loops of the control center, and transmitting the new calling number of the control center and/or the new identification number (code) of the calling user station from the control center to the calling station after having the connection established and storing this new calling or identification number in the memory of the calling station.

Upon the establishment, change or expansion of a telephone communications system employing the present invention, expenditures for skilled personnel and time are reduced considerably. Such telephone communications systems are easier to use and service and, in addition, offer less chance for unauthorized manipulation.

The invention will now be described with the aid of an exemplary embodiment of an emergency calling system.

When an additional user station is added to an existing network, the calling number and identification signal memory of the automatic dialing device is initially empty. Thus, the station can not yet perform its function and is blocked when it is switched on, for example, as the result of a plausibility check. Using a telephone, the number of the emergency center is then dialed and after the connection has been completed, the establishment of the new user station is announced over the telephone following which the card file or screen data of the station in the emergency center would be checked.

Upon actuation of an emergency key, the user terminal line is switched from the telephone instrument to the user station. The emergency center now transmits its calling number and the identification number of the calling station, and causes the transmitted information to be stored in the memory of the dialing device. A conventional remote control format may be used to transmit the memory information.

After the information has been stored in the memory, the user station becomes fully operational and an optional built in press-to-talk intercommunication system can be used for communication with the emergency center. With the aid of a release procedure, connection is broken at the central office.

Thereafter, if the user station is activated by the emergency key, the programmed calling number is automatically dialed After establishment of the connection with the emergency center, an emergency call telegram which includes the station number and the user identification is transmitted. The operation of the user station and its centrally stored data sets can then be centrally checked and start of operation centrally logged.

When the number of the center changes this center can be reached, during a transition period, with the old number as well as with the new number. Advantageously, if an emergency call comes in during this time, the calling number and identification signal memories are changed automatically or by an operator in the emergency center before the emergency call connection is released. In order to assure proper operation of the system, the emergency call users are then asked to make another emergency check call. Those subscriber stations which do not call the emergency center during this transition period with an emergency call are requested by the emergency center by telephone to actuate their emergency calling key so that the memories can be changed.

If short term buffered random access memories (RAM) are used for the calling number and identification signal memories, it is necessary to perform a constant plausibility check on the memory contents, since the memory contents may have changed due to a power supply breakdown. A negative result of such a plausibility check is indicated to the subscriber whereupon he must call the emergency center. In a modification of the present invention, the memories for the calling numbers and identification number are nonvolatile but electrically alterable read-only memories (EAROM).

In a further modification of the invention, the connection between the subscriber station and the emergency center for the purpose of storing or changing calling numbers and the identification number in the dialing device of the subscriber station is established by the emergency center. In this embodiment, the subscriber station is equipped with a call receiver which, in the manner of a telephone answering device, automatically switches the subscriber loop to the emergency calling station if the telephone receiver has not been lifted within a few seconds. Then, if an identifying signal such as a predetermined tone is received, information is stored or changed in the memory of the dialing device by the emergency center. If no such signal is received, the connection is automatically broken after a certain period of time. This method permits cyclic checking of the subscriber station by the emergency center to determine station operability thereby rendering the system even easier to use and simultaneously preventing unauthorized outside access.

DESCRIPTION OF THE PREFERRED EMBODIMENT

Figure 1:
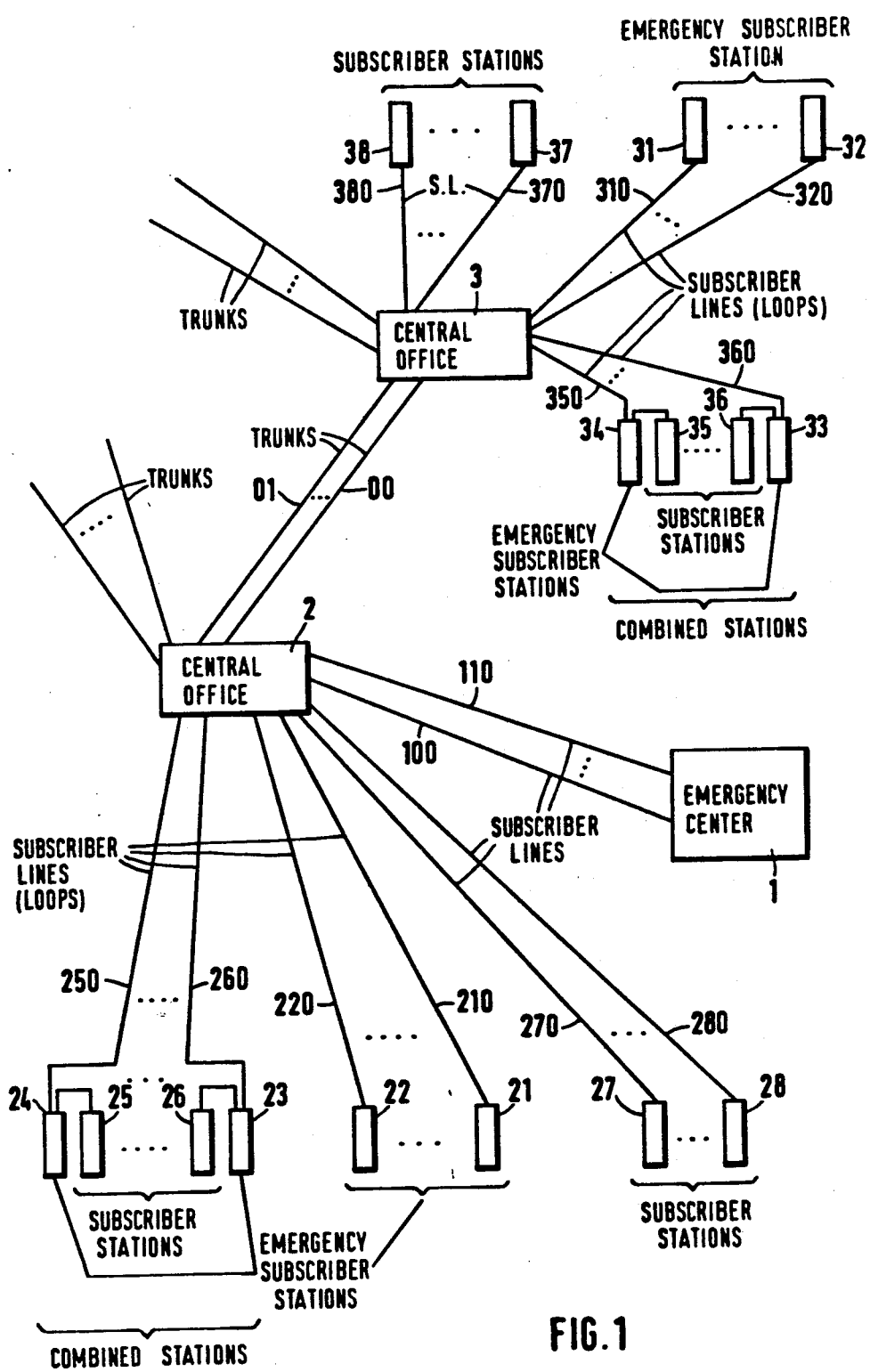
FIG. 1 shows a block diagram of a dialing network.

FIG. 1 shows a dialing network consisting of a central office 2, which is connected to another central office 3 via trunks 00,01. Subscriber stations 25-28 are connected to the central office 2 via subscriber loops 250 to 280 respectively. Other subscriber stations 35-38 are connected to the central office 3 via subscriber loops 350 to 380.

The central office 2 also has connections to an emergency center 1 via n subscriber lines 100 to 110. A plurality of emergency subscriber stations 21, 22 and 31, 32 are connected to the central office 2 via lines 210, 220 and to office 3 via lines 310, 320, respectively. Further emergency subscriber stations 23, 24 and 33, 34 are inserted at the end of subscriber lines 260, 250 and 360, 350, respectively, as combined stations.

Normal telephone traffic is possible between the subscriber stations. Emergency calls are allowed between the emergency subscriber stations and the emergency center by automatically dialing one of the calling numbers of this center by the emergency subscriber station after being activated by an emergency signal.

Figure 2:
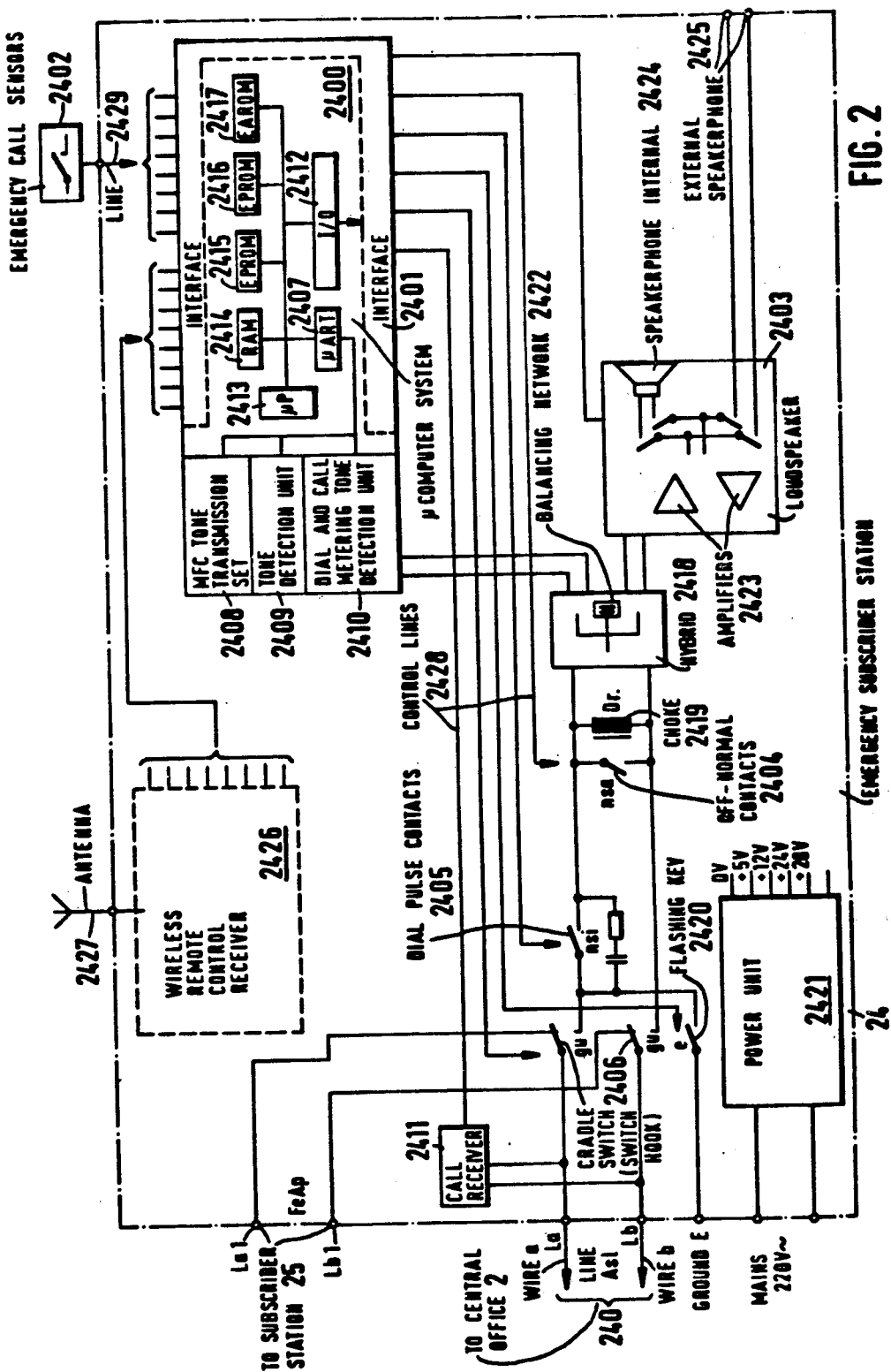
FIG. 2 is a functional block diagram of a preferred embodiment of an emergency subscriber station.

FIG. 2 is a functional block diagram of an emergency subscriber station 24 containing a microcomputer system 2400 connected via interface 2401 with emergency call sensors 2402, a loudspeaker 2403, off-normal contacts 2404 which are operated during dialing, dial pulse contacts 2405, a cradle switch 2406, a call receiver 2411, and tone detection and dial and call metering tone detection units 2409, 2410 and an MFC dial tone transmission set 2408 which are connected via a Universal Asynchronous Receiver Transmitter 2407 (UART) with a microprocessor 2413.

Normally the cradle switch 2406 connects the subscriber station 25 with the subscriber loops 240 having two wires a, b to which the call receiver 2411 is connected in parallel. The microcomputer system 2400 consists of the microprocessor 2413 (such as an RCA type 1802), a RAM 2414 which may be an NEC 446, EPROMS 2415 and 2416 (Intel type 2732), an EAROm 2417 (ER 2055 GI), UART 2407 (RCA type 1854) and an Input-Output I/O 2412 which connects to the interfaces 2401. MFC dial tone transmission set 2408 and detection units 2409, 2410 are connected to a hybrid 2418 containing a balancing network 2422. Hybrid 2418 is connected with the loudspeaker 2403 and is switchable via the cradle switch 2406 to the subscriber line 240.

Figure 3:
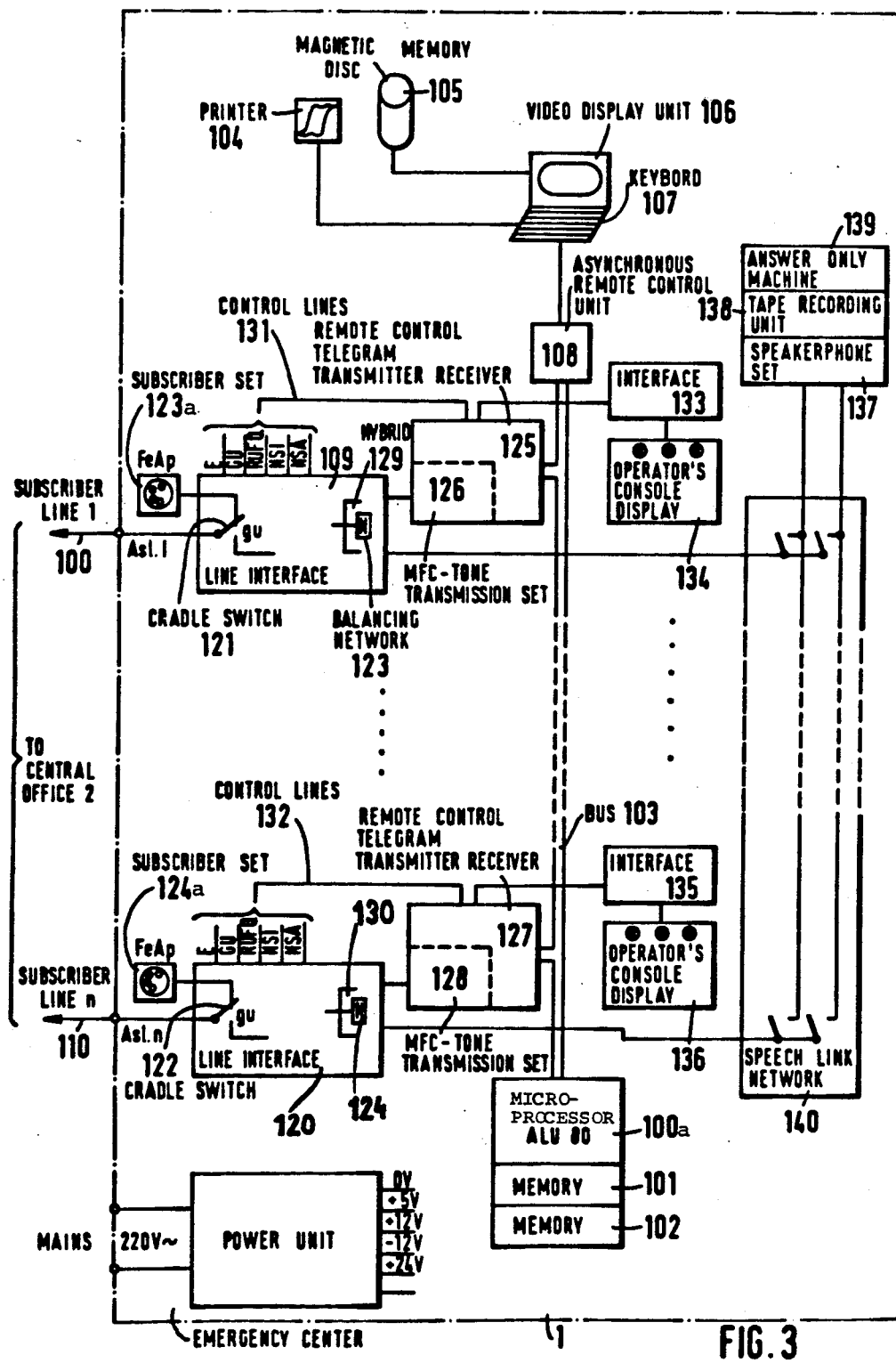
FIG. 3 is a functional block diagram of a preferred embodiment of an emergency center.

FIG. 3 shows a block diagram of the emergency center 1, of which the heart is a microcomputer system consisting of a microprocessor 100a (Intel 8085), memories 101, 102, and a bus 103 which serves a printer 104, a magnetic disc memory 105, a video display unit 106 and a keyboard 107 via an asynchronous remote control unit 108. The bus 103 also serves n subscriber lines 100 to 100 by line interfaces 109 to 120, which contain cradle switches 121 to 122, dial pulse contacts, off-normal contacts and hybrids 129 to 130 with balancing networks 123 to 124 in a configuration similar to that shown in FIG. 2. The bus is further connected to a multiple frequency code, tone transmission set 126, 128 such as a dual tone multiple frequency unit (DTMF) via a remote control telegram transmitter receiver 125, 127. The line interfaces 109, 120 are controlled by the remote control telegraph transmitter receivers 125, 127 (Intel 8085), via control lines 131, 132 in the same manner as microcomputer system 2400 controls via control lines 2428 in the emergency subscriber set 24 (FIG. 2). Transmitter-receivers 125, 127 are further connected with the operator's console displays 134, 136 via interfaces 133, 135.

While one arm of the hybrids 129, 130 is connected with a corresponding MFC tone transmission set 126, 128, the other arm is switchable to a speakerphone set 137 for the operator, to a tape recording unit 138 and to an answer only machine 139 via a speech link network 140.

The function of the emergency call system is the following. If an emergency call sensor 2402 is activated, its signal is received in microcomputer system 2400 via line 2429 or optionally via antenna 2427 and wireless remote control receive 2426. Cradle switch 2406 switches the line 240 from telephone station 25 to the emergency station 24. After having received and detected the dial tone, microprocessor 2413 starts and controls automatic dialing of the call number of the emergency center 1, which number is read out from EAROM 2417. When connection with emergency center 1 is established, an identification tone is received and detected by detection unit 2409 and the emergency telegram is transmitted by MFC transmission set 2408. In the center, the call is indicated both optically and acoustically. After having pressed a push button, the operator can see the contents of the emergency telegram, which contains the identification number and further data of the calling subscriber, on video display unit 106. The operation now can start a voice connection between the subscriber's speaker phone 2424, 2425 and his own speakerphone set 137 by sending an MFC-tone telegram. To update the subscriber memory EAROM 2417, the subscriber's telephone station 25 can be used to establish a connection to the center 1, where the operator can receive this normal call by his normal telephone set 123a, 124a. After recognizing the request he answers by an MFC-telegram via his keyboard 107, after the calling subscriber has changed over his cradle switch 2406, so that the telegram can be received and detected in microcomputer 2400 via MFC set 2408.

To change calling/identification numbers, the operator can establish a connection to the subscriber by dialing his set 123a–124a. When the subscriber answers, the process runs as described above. If the subscriber does not answer, call receiver 2411 detects the call in the same manner as an answer only machine and cradle switch 2406 is switched over. After detecting an identification tone received from the center 1, the microcomputer 2400 can be programmed with new data as described above.

It will be understood that the above description of the present invention is susceptible to various modifications, changes and adaptations, and the same are intended to be comprehended within the meaning and range of equivalents of the appended claims.

What is claimed is:

1. In combination with a common dial network comprising a central office, a central station connected to the central office by first subscriber lines and a plurality of user stations connected to the central office by second subscriber lines, said user stations including at least one calling station having a telephone instrument for communicating with said central station and a dialing device with a memory contained therein for establishing a connection between the calling station and the central station via the first and second subscriber lines, the method comprising the steps of:

establishing a connection by means of said telephone instrument between said calling station and said control station via said central office and said first and second subscriber lines;

switching said connection from said telephone instrument to said dialing device;

transmitting a calling number for said central station and at least one of a calling number and identification signal for said calling station from said central station to said calling station; and storing the transmitted calling number for said central station and at least one of the calling number and identification signal for said calling station in the memory of said calling station.

2. The method defined by claim 1 which comprises the further steps of initiating an emergency call by an emergency key, transmitting an emergency call telegram which includes the station numbers and the user identification from the station to said central station and establishing a voice connection between said calling station and said central station.

3. The method defined by claim 1 wherein said connection is established from said calling station.

4. The method defined by claim 1 wherein said connection is established from said central station.

5. The method defined by claim 4 wherein said connection is established after transmission of an identification number.

6. The method defined by claim 1 wherein said connection is established from said central station after transmission of an identification number.

7. The method defined by claim 1 wherein said at least one of the calling number and identification signal stored in the memory of said calling station is transmitted from said central station by audio frequency multiplex signals.

8. The method defined by claim 1 wherein, after storing said calling number, said connection is broken and said dialing remains connected to a subscriber telephone line to establish a test connection.

9. The method defined by claim 1 which comprises the further steps of conducting a plausibility check on the contents of said memory and indicating any error in the contents thereof.

10. The method defined by claim 1 wherein said memory includes calling number and identification number sections, at least one of said sections being nonvolatile.

11. A dialing device for use at a calling station of a common dial network comprising a central office, a central station and a plurality of other calling stations, said calling stations being coupled to said central office by subscriber lines for automatic connection therebetween, wherein the dialing device comprises a memory for storing a calling number for said central station and a calling number and identification signal for said calling station in response to signals transmitted from said central station.

* * * * *